(12) United States Patent
Heiss et al.

(10) Patent No.: US 10,055,194 B2
(45) Date of Patent: Aug. 21, 2018

(54) OPERATION BASED ON TWO OPERANDS

(71) Applicant: Infineon Technologies AG, Neubiberg (DE)

(72) Inventors: Stefan Heiss, Bobingen (DE); Markus Rau, Augsburg (DE)

(73) Assignee: Infineon Technologies AG, Neubiberg (DE)

( * ) Notice: Subject to any disclaimer, the term of this patent is extended or adjusted under 35 U.S.C. 154(b) by 334 days.

(21) Appl. No.: 14/614,529

(22) Filed: Feb. 5, 2015

(65) Prior Publication Data

US 2015/0220307 A1     Aug. 6, 2015

(30) Foreign Application Priority Data

Feb. 6, 2014   (DE) .................. 10 2014 001 647

(51) Int. Cl.
| | | |
|---|---|---|
| *G06F 7/00* | (2006.01) | |
| *G06F 7/50* | (2006.01) | |
| *H04L 9/00* | (2006.01) | |

(52) U.S. Cl.
CPC .............. *G06F 7/50* (2013.01); *G06F 7/00* (2013.01); *G06F 2207/7223* (2013.01); *G06F 2207/7257* (2013.01); *H04L 9/003* (2013.01); *H04L 2209/08* (2013.01)

(58) Field of Classification Search
CPC . G06F 7/50; G06F 7/506; G06F 7/508; G06F 7/509; G06F 21/00; G06F 21/71; G06F 2207/7223; G06F 2207/7233; G06F 2207/7238; G06F 21/558; G06F 2207/7219; G06F 21/75; G06F 21/72; G06F 7/723; G06F 9/3836; G06F 2207/7252; H04L 9/003; H04L 2209/08; H04L 2209/046; H04L 9/002; H04L 9/005

See application file for complete search history.

(56) References Cited

U.S. PATENT DOCUMENTS

| | | | | |
|---|---|---|---|---|
| 4,163,211 A | * | 7/1979 | Miura | H03K 19/1733 340/146.2 |
| 5,278,783 A | * | 1/1994 | Edmondson | G06F 7/508 708/711 |
| 6,295,606 B1 | * | 9/2001 | Messerges | G06F 21/558 380/1 |
| 6,298,135 B1 | * | 10/2001 | Messerges | G06F 7/723 380/1 |
| 6,839,847 B1 | * | 1/2005 | Ohki | G06F 7/72 380/268 |
| 9,916,261 B2 | * | 3/2018 | Gammel | G06F 21/755 |

(Continued)

FOREIGN PATENT DOCUMENTS

EP    0981115 A2    2/2000

OTHER PUBLICATIONS

German Patent Office, Office Action issued for DE 10 2014 001 6473.1, dated May 30, 2014.

(Continued)

*Primary Examiner* — Matthew Sandifer
(74) *Attorney, Agent, or Firm* — Schiff Hardin LLP

(57) ABSTRACT

A method for performing an operation based on at least two operands is proposed, in which steps of the operation are performed in time-randomized fashion. In addition, an apparatus, a computer program product and a computer-readable storage medium are accordingly specified.

17 Claims, 1 Drawing Sheet

(56) References Cited

U.S. PATENT DOCUMENTS

| | | | | |
|---|---|---|---|---|
| 2004/0025032 | A1* | 2/2004 | Chow | G06K 19/07363 |
| | | | | 713/189 |
| 2005/0232416 | A1* | 10/2005 | Sonnekalb | H04L 9/003 |
| | | | | 380/46 |
| 2008/0040414 | A1* | 2/2008 | Kuenemund | G06F 7/5016 |
| | | | | 708/490 |
| 2009/0010424 | A1* | 1/2009 | Qi | G06F 7/723 |
| | | | | 380/28 |
| 2011/0246789 | A1 | 10/2011 | Feix et al. | |
| 2012/0144205 | A1 | 6/2012 | Shu et al. | |
| 2012/0197956 | A1* | 8/2012 | Fischer | G06F 7/722 |
| | | | | 708/530 |
| 2015/0095659 | A1* | 4/2015 | Courousse | G06F 9/3001 |
| | | | | 713/190 |

OTHER PUBLICATIONS

Lang, H. W., Carry-Lookahead-Addierer, Sep. 6, 2012, URL: http://www.iti.fh-flensburg.de/lang/algorithmen/arithmetik/cla.htm [abgerufen am May 28, 2014].

Itoh, K., et al., "A Practical Countermeasure Against Address-Bit Differential Power Analysis", Cryptographic Hardware and Embedded Systems—CHES, 2003, Springer Berlin Heidelberg, 2003. pp. 382-396.

* cited by examiner

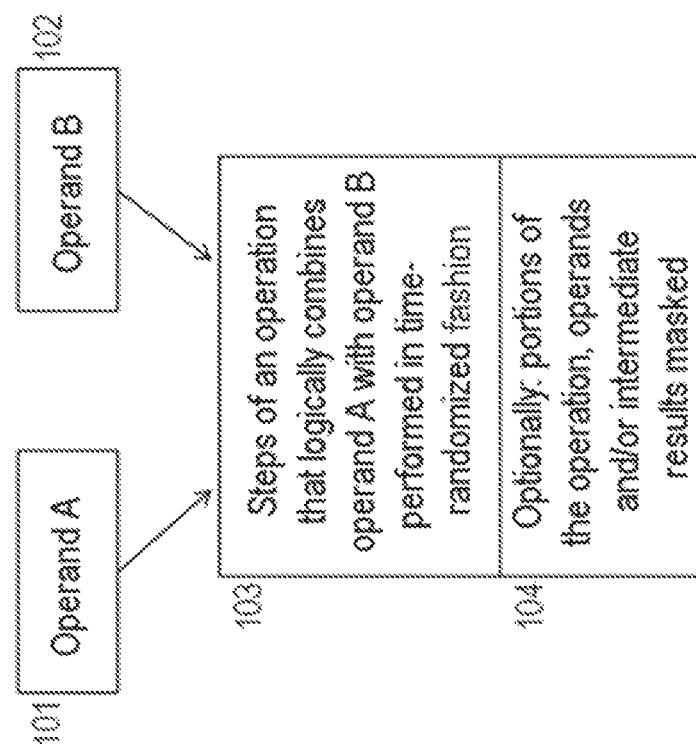

OPERATION BASED ON TWO OPERANDS

The disclosure relates to a method and a corresponding apparatus for performing an operation based on at least two operands. In addition, a computer program product and a computer-readable storage medium are proposed therefor.

Various attacks are known in order to spy out operations or else to influence said operations in an undesirable manner Examples thereof are well known as side channel attacks, which exploit an implementation of a cryptosystem on an appliance or in a piece of software.

For an operation (also called logic combination), e.g. addition of two operands A and B, it is possible to distinguish between the following cases, for example:

Case A) neither the two operands A and B is known to an attacker, and operands A and B exist only within the system.

Case B) one of the two operands is known to the attacker, since it is transmitted by means of an externally accessible communication protocol, for example.

Case C) the operation is performed on a nonsecure or partially nonsecure hardware platform.

Existing solutions have various gaps that are relevant to security, which means that the operation is ultimately not secure against attacks from third parties. One problem is noninvasive attacks, in particular, which do not permit any inference of whether an attack has taken place or whether such an attack was successful.

For case A), what are known as template attacks could be capable of successfully attacking the operation even though the two operands are not known externally. Thus, one disadvantage is that the attack could specifically impair the operation itself if execution patterns for the operation are identifiable and hence possibly manipulable.

For case B), side channel attacks in the form of template attacks are a possible risk.

For case C), in addition to the disadvantages described for cases A) and B), there are also various attack risks that are directed at the hardware. If a piece of hardware is susceptible to "probing attacks", for example, then it is possible for the attacker to be able to follow the operation too. A probing attack is an invasive attack, in particular, in which a chip is opened in order to read (secret) parameters. This can be done using one or more probes, for example. The probes are used to measure physical variables, e.g. voltages.

Hence, the hardware could be tapped specifically in respect of particular lines, e.g. lines that transmit a carry bit or a piece of side channel information. In case C), it is particularly disadvantageous that weaknesses in the hardware may not always be known from the outset and may first appear during certification or even subsequently thereto.

An object of the disclosure is to avoid the aforementioned disadvantages and particularly to provide a solution in which the performance of an operation, e.g. addition of two operands, has increased security toward attacks.

This object is achieved in accordance with the features of the independent claims. Preferred embodiments can be found in the dependent claims, in particular.

This object is achieved by proposing a method for performing an operation based on at least two operands, in which steps of the operation are performed in time-randomized fashion.

In this context, time-randomized means particularly that the steps of the operation are performed in a random or pseudo random (also: "scrambled") order. This applies particularly to at least some of the steps of the operation. Advantageously, the steps that can take place in parallel in relation to the operation are performed in time-randomized fashion. In this case, it is advantageous that even if the steps of the operation are observed it is not readily possible for an attacker to identify in what order what steps of the operation are performed and when.

It should be mentioned that "time-randomized" can involve an actually random or a pseudo random event. In particular, it is possible for the randomization also to involve the use of events that can be generated or evaluated by a machine, e.g. a processor or a controller. In particular, it is possible to exploit a deterministic event in order to achieve time randomization in the present sense. By way of example, such time randomization also includes scrambling of the steps of the operation, the chronological order of the steps being able to follow a random pattern or a pattern that can be determined in another way. By way of example, this may involve the selection of a pattern that is secret and/or allows a large number of different scramblings.

The proposed solution has the particular advantage that side channel attacks have a much lower probability of being successful. This also provides additional protection when a piece of hardware is classified as relatively secure. In addition, it is advantageous that the randomization, e.g. in conjunction with a particular bit length for at least one operand, makes a successful template attack at least significantly more difficult.

In this context, it should be noted that the operation may be based on at least two operands. The proposed solution can accordingly be applied to more than two operands, e.g. logic combination of more than two operands.

One development is that steps of the operation are performed in time-randomized fashion by virtue of access operations on portions of the operands being performed in time-randomized fashion.

By way of example, a portion of the operand may be a particular section that comprises a prescribed number of bits. By way of example, the portion of the operand may correspond to a word (e.g. 16 bits) of the operand. The operand is therefore processed in sections, with the operations on these portions (sections) being performed randomly or pseudo randomly.

Another development is that each of the operands is an integer that has a bit length of more than 128 bits, in particular.

In particular, any bit lengths, for example bit lengths with a power of two, e.g. 256 bits, 512 bits, 1024 bits or more, may be provided.

In particular, one development is that the operation is an addition that is based on a (in particular parallelizable) carry look ahead adder.

One development is also that generate bits and propagate bits of the carry look ahead adder are determined on the basis of a binary tree structure iteratively in the direction of the root of the binary tree structure, at least to some extent in time-randomized fashion.

Hence, the iterations are reduced at every level of the tree structure, e.g. from 64 via 32, 16, 8, 4, 2 to 1. Preferably, all iterations are performed in time-randomized fashion.

In addition, one development is that carry bits of the carry look ahead adder are determined on the basis of the binary tree structure iteratively in the direction of the root of the binary tree structure, at least to some extent in time-randomized fashion.

Thus, by way of example, the carry bits are determined starting at the lowest level of the tree structure (the root) through to the highest occupied level of the tree structure.

According to the numerical examples cited above, the number of iterations thus runs from 1 via 2, 4, 8, 16, 32 to 64.

As part of an additional development, the carry bits and the operands are added in time-randomized fashion.

A subsequent development is that the operation is a subtraction.

One embodiment is that the operation is a comparison operation for the two operands. The comparison operation may also include a comparison of two memory contents.

An alternative embodiment is that the steps of the operation are performed at least to some extent with masked data.

In this case, masked data are encrypted data, in particular. Thus, by way of example, single bits of the operation, e.g. carry bits, generate bits and/or propagate bits, can be encrypted symmetrically by means of what is known as a mask (that is to say a secret key, for example). For the encryption, it is possible to use an exclusive or function (XOR function): this can be used to encrypt a datum into a masked datum using the mask; accordingly, the masked datum can be decrypted into the datum using the mask; the following therefore applies:

datum→masked datum→datum where the arrow indicates the logic combination by means of the XOR function using the mask.

Preferably, masking is used at the start of the operation, for example, but extends to the end of the operation. Hence, attacks on the operation can be made more difficult once again if during the operation at least a portion of the data is always masked.

A subsequent embodiment is that the masked data comprise at least one processing bit of the operation.

One embodiment is also that the processing bit is one of the following bits:
a carry bit,
a propagate bit,
a generate bit.

One development is that the operands are masked and the result of the operation is demasked at the end of the operation.

An additional embodiment is that the operands are masked with a shared mask or with two different masks.

The aforementioned object is also achieved by an apparatus comprising a processing unit that is set up to perform an operation based on two operands, wherein steps of the operation can be performed in time-randomized fashion.

The processing unit cited in the present case may be designed particularly as a processor unit and/or an at least to some extent hardwired or logic circuit arrangement that, by way of example, is set up such that the method can be performed as described herein. Said processing unit may be or comprise any type of processor or arithmetic unit or computer with correspondingly necessary peripherals (memory, input/output interfaces, input/output device, etc.).

The solution presented in this case additionally comprises a computer program product that can be loaded directly into a memory of a digital computer, comprising program code portions that are suitable for performing steps of the method described in this case.

In addition, the aforementioned problem is solved by means of a computer-readable storage medium, e.g. an arbitrary memory, comprising instructions (e.g. in the form of program code) that can be executed by a computer and that are suitable for the computer to perform steps of the method described in this case.

The above explanations concerning the method apply to the respective apparatus or arrangement and to the other claim categories as appropriate. By way of example, the apparatus may be embodied in one component or in a manner distributed in a plurality of components.

The aforementioned object is also achieved by means of a system comprising at least one of the apparatuses described in the present case.

The properties, features and advantages of this disclosure that are described above and also the way in which they are achieved will become clearer and more distinctly comprehensible in the connection with the schematic description of exemplary embodiments that follows, which is explained in more detail in connection with the drawing, in which, for the sake of clarity, elements that are the same or have the same action may be provided with the same reference symbols and in which:

FIG. 1 shows a schematic diagram with steps to increase the security of an operation based on two operands vis-à-vis side channel attacks, for example.

The aim of the disclosure is to provide an implementation of arithmetic addition of two operands A and B that is resistant (=hardened) to side channel attacks, in particular, i.e.

$$R=A+B,$$

where one of the two operands (long numbers) A or B is meant to have a length of at least 512 bits, for example. Hence, the result R of the addition is also accordingly at least 512 bits long.

It is proposed that the access operations on portions of the operands be randomized. By way of example, it is possible for the access operations on word elements from the long number operands to be time-randomized.

Upward of a particular bit length, e.g. at least 512 bits, it is possible, in conjunction with the time randomization, for a risk of a successful DPA template attack (DPA: "Differential Power Analysis") or a successful probing attack to be significantly reduced. The reason for this is the large number of combination options: by way of example, in the case of a 16-bit architecture, a 512-bit number corresponds to 32 16-bit words, which commands $$32!=2.6E+35$$

different combination options.

In this case, it should be noted that the present randomization can involve (at least) one random or one pseudo random event. In particular, it is possible for the randomization also to involve the use of events that can be generated or evaluated by a machine, e.g. a processor or a controller.

The solution presented in the present case increases the security of an operation that is based on two operands, in particular. Examples of such operations are: addition, subtraction, comparison operation (e.g.: are both operands identical? Is the first operand smaller/larger than the second operand?). In particular, the operands may be long integral operands that have a bit length of more than 128 bits, 256 bits, 512 bits, etc., for example. In principle, the bit length is not limited to a power of two, with bit lengths of 257 or 258 bits, for example also being possible.

A known "carry look ahead adder" (also called a CLA) is a parallel method for calculating a sum of two n-bit binary numbers in time O (log (n)).

In particular, it is proposed that the known "carry look ahead adder" be extended such that at least a portion of the execution steps is randomized, that is to say takes place randomly or pseudo randomly. Hence, it is not readily possible for the chronological order of the processing steps to be able to be used to infer a pattern in the current profile of the operations that are to be performed. As mentioned, the identification of such a pattern is made difficult by the quality of the randomization and the length of the operands. Hence, the effect achieved by the randomization is that at no time in the calculation is it known what word index from the operands to be protected and from the result is currently being processed.

The CLA is well suited to time randomization, since it involves a parallel method in which the carry calculation takes place separately from the actual addition.

In one development, the time randomization of the CLA adder is additionally combined with masking of the generate bits, propagate bits and/or carry bits.

An exemplary implementation as executable code in the programming language ARIBAS is presented below as "Random Carry Look Ahead Addition" function. In addition, an alternative implementation with masking is indicated as a "Random Carry Look Ahead Addition_Full Masked" function. In this case, it is possible for generate bits, propagate bits and the individual carry bits to be randomized and masked completely by a binary tree.

In addition, an example of subtraction (without masking) is indicated in a "Random Carry Look Ahead Subtraction" function. Accordingly, it would also be possible for another operation, e.g. a comparison between two operands A and B, to be performed. Both the subtraction and the arbitrary other operation could be implemented with masking, as shown for the example of addition.

In addition, a "Long Integer Addition_Alternative" function is also shown, which is an alternative randomized solution for the addition of the two operands A and B.

Exemplary Implementations

The program code below is written in the programming language ARIBAS, which is an interactive interpreter for big integer arithmetic and multi-precision floating point arithmetic with a Pascal/Modula like syntax.

First of all, a data type "CLONG" is defined as follows:

```
type
    CLONG = record
        bitlength        : integer;
        wordsallocated   : integer;
        datarray         : array of integer;
    end;
end;
```

The data type CLONG has the task of modeling a non-negative integer of prescribed length. The prescribed length may be at least 256 bits, for example.

By way of example, the following parameter is chosen to emulate a 16-bit platform:

_datalength_:=16

In addition, the following auxiliary functions are defined: the function ALLOCCLONG allocates n words for an entity of the type CLONG and fills it with random values. The function GetWord reads the i-th data field from a CLONG data type. In this case, the index 0 corresponds to the least significant word (LSW).

```
function ALLOCCLONG(n : integer) : CLONG
external
    _datalength_    : integer;
var
    cl   : CLONG;
    st   : stack;
    i    : integer;
```

-continued

```
function ALLOCCLONG(n : integer) : CLONG
begin
    if not(n>0) then
        writeln("Error in AllocClong: n=", n);
        halt(0);
    end;
    (*** START ***)
    cl.wordsallocated := n;
    cl.bitlength      := 0;
    cl.datarray       := alloc(array, n);
    for i:= 0 to n-1 do
        cl.datarray[i] := random(2**_datalength_);
    end;
    return cl;
end;
```

```
function GetWord(cl : CLONG; i : integer): integer
external
    _datalength_    : integer;
var
    n               : integer;
begin
    n := (cl.bitlength + (_datalength_ -1)) div _datalength_;
    if (i<n) then
        return cl.datarray[n-1-i];
    else
        return 0;
    end;
end;
```

The main function ("MAIN") is described below. A sum R for the two operands A and B is calculated. The calculation is performed by virtue of individual steps of the calculation being performed in an order that is swapped randomly over time (also called time randomization). This scrambles the memory access to operands A and B and also the result R. The exemplary implementation uses randomized carry look ahead addition based on the following steps:

(1) Erase the result data field of the type CLONG.
(2) Calculate first level generate and propagate bits:
    Calculation of the generate bits and the propagate bits of the first level in time-randomized fashion, i.e. on the basis of word (A) and word (B) for a particular index i (the term "word" denotes a word, i.e. particularly a sequence of bits, e.g. 16 bits). In the present example, word (A) is equivalent to GetWord(A, i) and word (B) is equivalent to GetWord(B, i):
    a generate bit is produced if word (A)+word (B) results in an overflow;
    a propagate bit is produced if word (A) XOR word (B) (XOR: exclusive-or-function) results in 0xFFFF or if word (A)+word (B) results in 0xFFFF.
(3) Calculate second level and subsequent levels of generate and propagate bits or calculate the remaining levels of generate bits and propagate bits:
    After the first level of the generate bits and propagate bits has been calculated, the subsequent calculation is performed on the basis of a binary tree structure in time-randomized fashion. By way of example, it is assumed that the two variables CLONG A and B each have a long number with 1024 bits. This corresponds to 1024/16=64 words (one word corresponds to 16 bits, for example) on a 16-bit platform. While the calculation of the first level requires 64 generate bits and 64 propagate bits, the second level still involves 32 bits of each and the third level also involves 16 bits of each, etc., being calculated. Hence, the iterations are reduced from 64 via 32, 16, 8, 4, 2 to 1. All the iterations are performed in time-randomized fashion.
(4) Calculate carry bits:
  On the basis of the generate bits and the propagate bits, the individual carry bits are subsequently calculated in time-randomized fashion, beginning at the lowest level through to the first level of the carry bits, i.e. the iterations run from 1 via 2, 4, 8, 16, 32 to 64.

(5) The carry bits and the individual words are added (i.e. the carry bits are added to the sum of word(A)+word(B)). The last block adds the respective carry bit to the individual word. This is also done in a time-randomized order.

The parameters A and B are each of the type CLONG and are the operands of the addition. The result is stored in the parameter R (likewise of the type CLONG).

```
function RandomCarryLookAheadAddition(A,B : CLONG) : CLONG;
external
    _datalength_           : integer;
var
    i, j, k, sm            : integer;
    h                      : integer;
    wA, wB                 : integer;
    numWords               : integer;
    cy                     : array of integer;
    gen                    : array of integer;
    prop                   : array of integer;
    a, b, c                : integer;
    w2powX                 : integer;
    weightedMask           : integer;
    wMask1Bit              : integer;
    R                      : CLONG;
begin
    numWords     := (A.bitlength + (_datalength_ -1)) div _datalength_;
    numWords     := max( numWords, (B.bitlength + (_datalength_ -1)) div _datalength_ );
    R            := ALLOCCLONG( numWords + 1 );
    R.bitlength  := (numWords+1)*_datalength_;
    cy           := alloc(array, numWords+1);
    gen          := alloc(array, numWords+1);
    prop         := alloc(array, numWords+1);
    cy[0]        := 0;
    wMask1Bit    := 0x4000;
    w2powX       := 1;
    while not( wMask1Bit = 0 ) do
        if not(bit_and(wMask1Bit, bit_or(1,(numWords-1)))=0) then
            w2powX := wMask1Bit * 2;
            wMask1Bit := 0;
        end;
        wMask1Bit := wMask1Bit div 2;
    end;
    w2powX       := w2powX - 1;
    #################################################
    # (1) Erase the result data field of the type CLONG#
    #################################################
    for l:= 0 to numWords + 1 -1 do
        R.datarray[i] := 0;
    end;
    #################################################
    # (2) Calculate first level generate and propagate bits #
    #################################################
    a := random(2**_datalength_);
    b := random(2**_datalength_);
    b := bit_or(b, 1);
    c := random(2**_datalength_);
    for j:= 0 to w2powX do
        i := bit_and( bit_xor( (bit_xor(j,a) * b), c), w2powX);
        if ( i < numWords ) then
            wA           := Getword(A, i);
            wB           := Getword(B, i);
            gen[i+1]     := (wA + wB) div (2**_datalength_);
            prop[i+1]    := (bit_xor(wA, wB) + 1) div (2**_datalength_);
        end;
    end;
    #################################################
    # (3) Calculate second level and subsequent levels #
    #    of generate and propagate bits              #
    #################################################
    w2powX                := w2powX div 2;
    weightedMask:= w2powX * 2;
    h  := 2;
    while h<=numWords do
        a := random(2**_datalength_);
        b := random(2**_datalength_);
        b := bit_and( bit_or(b, h), bit_xor( (2**_datalength_)-1, h-1 ));
```

```
            function RandomCarryLookAheadAddition(A,B : CLONG) : CLONG;
                    c := random(2**_datalength_);
                    for j:= 0 to w2powX do
                            i := bit_and( bit_xor( (bit_xor(j,a) * b), c), weightedMask)
+ h;
                            if ( i <= numWords ) then
                                    gen[i]      := bit_or(gen[i], bit_and(gen[i−(h div
2)], prop[i]));
                                    prop[i]     := bit_and(prop[i], prop[i−(h div 2)]);
                            end;
                    end;
                    weightedMask:= bit_and(weightedMask, bit_xor((2**_datalength_)−1,
h) );
                    w2powX          := w2powX div 2;
                    h               := h * 2;
            end;
            ##########################
            # (4) Calculate carry bits #
            ##########################
            h    := h div 2;
            while h>=1 do
                    a := random(2**_datalength_);
                    b := random(2**_datalength_);
                    b := bit_and( bit_or(b, h * 2), bit_xor( (2**_datalength_)−1, h*2−
1 ));
                    c := random(2**_datalength_);
                    for j:= 0 to w2powX do
                            i := bit_and( bit_xor( (bit_xor(j,a) * b), c), weightedMask)
+ h;
                            if ( i <= numWords ) then
                                    cy[i] := bit_or(gen[i], bit_and(cy[i−h], prop[i]));
                            end;
                    end;
                    weightedMask := bit_or(weightedMask, h );
                    w2powX          := w2powX * 2 + 1;
                    h               := h div 2;
            end;
            ##############################################################
            # (5) Add carry bits to the sum of the individual words #
            ##############################################################
            numWords := numWords + cy[numWords];
            a := random(2**_datalength_);
            b := random(2**_datalength_);
            b := bit_or(b, 1);
            c := random(2**_datalength_);
            for j:= 0 to w2powX do
                    i := bit_and( bit_xor( (bit_xor(j,a) * b), c), w2powX);
                    if ( i < numWords ) then
                            R.datarray[R.wordsallocated−1−i]    := (GetWord(A, i) +
GetWord(B,i) + cy[i]) mod 2**_datalength_;
                    end;
            end;
            return R;
end;
```

An extended version is proposed below that masks the generate bits and the propagate bits with one bit mask (that is to say one bit pattern) M each, so that they are not visible in plain text.

By way of example, a mask bit is used for each generate bit and a mask bit which is used for each propagate bit. Hence, each word position has its own 1-bit mask for each generate bit and propagate bit.

The algorithm calculates masked carry bits. The respective mask is composed from the mask of the generate bit and of the propagate bit per word position.

This ensures that the masking is effected continuously through steps (1) to (5) explained above.

Ultimately, an AND operation is intended to be effected using the aforementioned masks. In particular, the operation is intended to be masked continually—that is to say until the end of the operation. In other words, it is thus possible for the demasking to be effected only at the end of the operation, which increases security against side channel attacks during the individual calculation steps.

Operands A and B are the original values before the masking and Res is the result of the binary ANDing of operands A and B. Thus, the following holds:

$M\text{Res} = \text{bit\_and}(MA, MB) \text{mit}$

MA=M XOR A und
MB=M XOR B.

The following is obtained:

$$M\text{Res} = M \text{ XOR } \text{Res} = M \text{ XOR } (A \text{ AND } B) =$$
$$= M \text{ XOR } ((M \text{ XOR } MA) \text{ AND } (M \text{ XOR } MB))$$

This calculation is intended to be performed without working out the two inner parentheses, i.e. without interim demasking.

In order to avoid the interim demasking, the following formula is used:

$$MRes' = (M \text{ AND } MA) \text{ OR } (M \text{ AND } MB) \text{ OR } (MA \text{ AND } MB).$$

The arithmetic sum $$Sum = M + MA + MB$$

is 2 or 3 if MRes=1. The above formula can also be verified using the table below.

| A | B | M | MA | MB | MRes | Sum | Res |
|---|---|---|----|----|----|-----|-----|
| 0 | 0 | 0 | 0  | 0  | 0  | 0   | 0   |
| 0 | 1 | 0 | 0  | 1  | 0  | 1   | 0   |
| 1 | 0 | 0 | 1  | 0  | 0  | 1   | 0   |
| 1 | 1 | 0 | 1  | 1  | 1  | 2   | 1   |
| 0 | 0 | 1 | 1  | 1  | 1  | 3   | 0   |
| 0 | 1 | 1 | 1  | 0  | 1  | 2   | 0   |
| 1 | 0 | 1 | 0  | 1  | 1  | 2   | 0   |
| 1 | 1 | 1 | 0  | 0  | 0  | 1   | 1   |

Hitherto, it has been assumed that the masks for A and B are identical. In the text below, this approach is extended to mutually independent masks M1 and M2 for A and B. Accordingly, there follows a masked result MRes':

$$MRes' = [(M1 \text{ XOR } M2) \text{ AND } (MA \text{ XOR } M2)] \text{ OR } \\ [(M1 \text{ XOR } M2) \text{ AND } (MB \text{ XOR } M1)] \text{ OR } \\ [(MA \text{ XOR } M2) \text{ AND } (MB \text{ XOR } M1)]$$

where
MA = A XOR M1
MB = B XOR M2
M' = M1 XOR M2
MA' = A XOR M'
MB' = B XOR M'

$$MRes = (M \text{ AND } MA) \text{ OR } (M \text{ AND } MB) \text{ OR } (MA \text{ AND } MB)$$

$$MRes' = (M' \text{ AND } MA') \text{ OR } (M' \text{ AND } MB') \text{ OR } (MA' \text{ AND } MB')$$

$$MRes' = ((M1 \text{ XOR } M2) \text{ AND } (A \text{ XOR } M1 \text{ XOR } M2)) \text{ OR } ((M1 \text{ XOR } M2) \text{ AND } (B \text{ XOR } M1 \text{ XOR } M2)) \text{ OR } ((A \text{ XOR } M1 \text{ XOR } M2) \text{ AND } (B \text{ XOR } M1 \text{ XOR } M2))$$

With the following substitution

MA = A XOR M1,

MB = B XOR M2, the result is $$MRes'((M1 \text{ XOR } M2) \text{ AND } (MA \text{ XOR } M2)) \text{ OR } \\ ((M1 \text{ XOR } M2) \text{ AND } (MB \text{ XOR } M1)) \text{ OR } \\ ((MA \text{ XOR } M2) \text{ AND } (MB \text{ XOR } M1))$$

or $$MRes' = Res \text{ XOR } M1 \text{ XOR } M2.$$

The above formula can also be verified using the table below.

| M1 | M2 | A | B | MA | MB | MRes | Res |
|----|----|---|---|----|----|----|-----|
| 0  | 0  | 0 | 0 | 0  | 0  | 0  | 0   |
| 0  | 0  | 0 | 1 | 0  | 1  | 0  | 0   |
| 0  | 0  | 1 | 0 | 1  | 0  | 0  | 0   |
| 0  | 0  | 1 | 1 | 1  | 1  | 1  | 1   |
| 0  | 1  | 0 | 0 | 0  | 1  | 1  | 0   |
| 0  | 1  | 0 | 1 | 0  | 0  | 1  | 0   |
| 0  | 1  | 1 | 0 | 1  | 1  | 1  | 0   |
| 0  | 1  | 1 | 1 | 1  | 0  | 0  | 1   |
| 1  | 0  | 0 | 0 | 1  | 0  | 1  | 0   |
| 1  | 0  | 0 | 1 | 1  | 1  | 1  | 0   |
| 1  | 0  | 1 | 0 | 0  | 0  | 1  | 0   |
| 1  | 0  | 1 | 1 | 0  | 1  | 0  | 1   |
| 1  | 1  | 0 | 0 | 1  | 1  | 0  | 0   |
| 1  | 1  | 0 | 1 | 1  | 0  | 0  | 0   |
| 1  | 1  | 1 | 0 | 0  | 1  | 0  | 0   |
| 1  | 1  | 1 | 1 | 0  | 0  | 1  | 1   |

Depending on what result is meant to be attained, one of the two masks is removed, or corresponding demasking is performed, in the interim.

```
function RandomCarryLookAheadAddition_FullMasked(A,B : CLONG) : CLONG;
external
    _datalength_       : integer;
var
    i, j, k, sm        : integer;
    h                  : integer;
    wA, wB             : integer;
    numWords           : integer;
    cy                 : array of integer;
    gen                : array of integer;
    prop               : array of integer;
    genMask            : array of integer;
    propMask           : array of integer;
    a, b, c            : integer;
    w2powX             : integer;
    weightedMask       : integer;
    wMasklBit          : integer;
    R                  : CLONG;
begin
    numWords   := (A.bitlength + (_datalength_ -1)) div _datalength_;
    numWords   := max( numWords, (B.bitlength + (_datalength_ -1)) div _datalength_ );
    R          := ALLOCCLONG( numWords + 1 );
    R.bitlength := (numWords+1)*_datalength_;
    cy         := alloc(array, numWords+1);
    gen        := alloc(array, numWords+1);
    prop       := alloc(array, numWords+1);
    genMask    := alloc(array, numWords+1);
```

```
function RandomCarryLookAheadAddition_FullMasked(A,B : CLONG) : CLONG;
    propMask       := alloc(array, numWords+1);
    genMask[0]     := random(2);
    cy[0]          := genMask[0];
    propMask[0]    := 0;
    wMask1Bit      := 0x4000;
    w2powX         := 1;
    while not( wMask1Bit = 0 ) do
        if not(bit_and(wMask1Bit, bit_or(1,(numWords−1)))=0) then
                w2powX := wMask1Bit * 2;
                wMask1Bit := 0;
        end;
        wMask1Bit := wMask1Bit div 2;
    end;
    w2powX := w2powX − 1;
    ###################################################
    # (1) Erase the result data field of the type CLONG#
    ###################################################
    for i:= 0 to numWords + 1 −1 do
        R.datarray[i]  := 0;
    end;
    ###########################################################
    # (2) Calculate first level generate and propagate bits #
    ###########################################################
    a := random(2**_datalength_);
    b := random(2**_datalength_);
    b := bit_or(b, 1);
    c := random(2**_datalength_);
    for j:= 0 to w2powX do
        i := bit_and( bit_xor( (bit_xor(j,a) * b), c), w2powX);
        if ( i < numWords ) then
                wA              := GetWord(A, i);
                wB              := GetWord(B, i);
                genMask[i+1]    := random(2);
                propMask[i+1]   := random(2);
                gen[i+1]        := bit_xor( genMask[i+1], (wA + wB) div
(2**_datalength_));
                prop[i+1]       := bit_xor( propMask[i+1], (bit_xor(wA,
wB) + 1) div (2**_datalength_));
        end;
    end;
    ###################################################
    # (3) Calculate second level and subsequent levels #
    #     of generate and propagate bits              #
    ###################################################
    w2powX         := w2powX div 2;
    weightedMask   := w2powX * 2;
    h              := 2;
    while h<=numWords do
        a := random(2**_datalength_);
        b := random(2**_datalength_);
        b := bit_and( bit_or(b, h), bit_xor( (2**_datalength_)−1, h−1 ));
        c := random(2**_datalength_);
        for j:= 0 to w2powX do
                i := bit_and( bit_xor( (bit_xor(j,a) * b), c), weightedMask)
+ h;
                if ( i <= numWords ) then
                        gen[i] := bit_xor( bit_xor( bit_xor( gen[i], bit_or(
bit_and( bit_xor(genMask[i−(h div 2)], propMask[i]), bit_xor(gen[i−(h div
2)], propMask[i])), bit_or( bit_and( bit_xor(genMask [i−(h div 2)],
propMask[i]), bit_xor(prop[i], genMask[i−(h div 2)])), bit_and(
bit_xor(gen[i−(h div 2)], propMask[i]), bit_xor(prop[i], genMask[i−(h div
2)])))))), genMask[i−(h div 2)]), propMask[i]);
                        prop[i]:= bit_xor( propMask[i−(h div 2)], bit_or(
bit_and( bit_xor(propMask[i], propMask[i−(h div 2)]), bit_xor(prop[i],
propMask[i−(h div 2)])), bit_or( bit_and( bit_xor(propMask[i], propMask[i−(h
div 2)]), bit_xor(prop[i−(h div 2)], propMask[i])), bit_and( bit_xor(prop[i],
propMask[i−(h div 2)]), bit_xor(prop[i−(h div 2)], propMask[i])))));
                end;
        end;
        weightedMask:= bit_and(weightedMask, bit_xor((2**_datalength_)−1,
h) );
        w2powX          := w2powX div 2;
        h               := h * 2;
    end;
    ############################
    # (4) Calculate carry bits #
    ############################
```

```
         function RandomCarryLookAheadAddition_FullMasked(A,B : CLONG) : CLONG;
```

```
      h := h div 2;
      while h>=1 do
            a := random(2**_datalength_);
            b := random(2**_datalength_);
            b := bit_and( bit_or(b, h * 2), bit_xor( (2**_datalength_)-1, h*2-
1 ));
            c := random(2**_datalength_);
            for j:= 0 to w2powX do
                     i := bit_and( bit_xor( (bit_xor(j,a) * b), c), weightedMask)
+ h;
                     if ( i <= numWords ) then
                             cy[i] := bit_xor( bit_xor( gen[i], bit_or( bit_and(
bit_xor(bit_xor(genMask[i-h],propMask[i-h]), propMask[i]), bit_xor(cy[i-h],
propMask[i])), bit_or( bit_and( bit_xor(bit_xor(genMask[i-h],propMask[i-h]),
propMask[i]), bit_xor(prop[i], bit_xor(genMask[i-h],propMask[i-h]))),
bit_and( bit_xor(cy[i-h], propMask[i]), bit_xor(prop[i], bit_xor(genMask[i-
h],propMask[i-h]))))), bit_xor(genMask[i-h],propMask[i-h]));
                     end;
            end;
            weightedMask:= bit_or(weightedMask, h );
            w2powX       := w2powX * 2 + 1;
            h            := h div 2;
      end;
      ##############################################################
      # (5) Add carry bits to the sum of the individual words      #
      ##############################################################
      numWords : = numWords +
bit_xor(propMask[numWords],bit_xor(genMask[numWords],cy[numWords]));
      a := random(2**_datalength_);
      b := random(2**_datalength_);
      b := bit_or(b, 1);
      c := random(2**_datalength_);
      for j:= 0 to w2powX do
            i := bit_and( bit_xor( (bit_xor(j,a) * b), c), w2powX);
            if ( i < numWords ) then
                     R.datarray[R.wordsallocated-1-i]   := (GetWord(A, i) +
GetWord(B,i) + bit_xor(propMask[i], bit_xor(genMask[i],cy[i]))) mod
2**_datalength_;
            end;
      end;
      return R;
end;
```

Instead of the addition, it is also possible to perform any other operation on the basis of the approach proposed here. This is shown below for a subtraction $R=A-B$, with it being assumed by way of example that A is greater than or equal to B.

```
         function RandomCarryLookAheadSubtraction(A,B : CLONG) : CLONG;
```

```
external
      _datalength_           : integer;
var
      i, j, k, sm            : integer;
      h                      : integer;
      wA, wB                 : integer;
      numWords               : integer;
      cy                     : array of integer;
      gen                    : array of integer;
      prop                   : array of integer;
      a, b, c                : integer;
      w2powX                 : integer;
      weightedMask           : integer;
      wMask1Bit              : integer;
      R                      : CLONG;
begin
      numWords      := (A.bitlength + (_datalength_ -1)) div _datalength_;
      numWords      := max( numWords, (B.bitlength + (_datalength_ -1)) div
_datalength_ );
      R             := ALLOCCLONG( numWords + 1 );
      R.bitlength   := (numWords+1)*_datalength_;
```

```
function RandomCarryLookAheadSubtraction(A,B : CLONG) : CLONG;
    cy              := alloc(array, numWords+1);
    gen             := alloc(array, numWords+1);
    prop            := alloc(array, numWords+1);
    cy[0]           := 1;
    wMask1Bit       := 0x4000;
    w2powX          := 1;
    while not( wMask1Bit = 0 ) do
        if not(bit_and(wMask1Bit, bit_or(1,(numWords-1)))=0) then
                w2powX := wMask1Bit * 2;
                wMask1Bit := 0;
        end;
        wMask1Bit := wMask1Bit div 2;
    end;
    w2powX := w2powX - 1;
    ######################################################
    # (1) Erase the result data field of the type CLONG#
    ######################################################
    for i:= 0 to numWords + 1 -1 do
        R.datarray[i]   := 0;
    end;
    ######################################################
    # (2) Calculate first level generate and propagate bits #
    ######################################################
    a := random(2**_datalength_);
    b := random(2**_datalength_);
    b := bit_or(b, 1);
    c := random(2**_datalength_);
    for j:= 0 to w2powX do
        i := bit_and( bit_xor( (bit_xor(j,a) * b), c), w2powX);
        if ( i < numWords ) then
                wA          := GetWord(A, i);
                wB          := GetWord(B, i);
                wB          := bit_xor( wB, (2**_datalength_)-1);
                gen[i+1]    := (wA + wB) div (2**_datalength_);
                prop[i+1]   := (bit_xor(wA, wB) + 1) div (2**_datalength_);
        end;
    end;
    ######################################################
    # (3) Calculate second level and subsequent levels #
    #     of generate and propagate bits           #
    ######################################################
    w2powX              := w2powX div 2;
    weightedMask        := w2powX * 2;
    h                   := 2;
    while h<=numWords do
        a := random(2**_datalength_);
        b := random(2**_datalength_);
        b := bit_and( bit_or(b, h), bit_xor( (2**_datalength_)-1, h-1 ));
        c := random(2**_datalength_);
        for j:= 0 to w2powX do
                i := bit_and( bit_xor( (bit_xor(j,a) * b), c), weightedMask)
+ h;
                if ( i <= numWords ) then
                        gen[i]   := bit_or(gen[i], bit_and(gen[i-(h div 2)],
prop[i]));
                        prop[i] := bit_and(prop[i], prop[i-(h div 2)]);
                end;
        end;
        weightedMask: = bit_and(weightedMask, bit_xor((2**_datalength_)-1,
h) );
        w2powX          := w2powX div 2;
        h               := h * 2;
    end;
    #########################
    # (4) Calculate carry bits #
    #########################
    h := h div 2;
    while h>=1 do
        a := random(2**_datalength_);
        b := random(2**_datalength_);
        b := bit_and( bit_or(b, h * 2), bit_xor( (2**_datalength_)-1, h*2-
1 ));
        c := random(2**_datalength_);
        for j:= 0 to w2powX do
                i := bit_and( bit_xor( (bit_xor(j,a) * b), c), weightedMask)
```

```
function RandomCarryLookAheadSubtraction(A,B : CLONG) : CLONG;
```

```
        + h;
                if ( i <= numWords ) then
                        cy[i] := bit_or(gen[i], bit_and(cy[i-h], prop[i]));
                end;
        end;
        weightedMask   := bit_or(weightedMask, h );
        w2powX         := w2powX * 2 + 1;
        h              := h div 2;
    end;
    ###############################################################
    # (5) Add carry bits to the sum of the individual words #
    ###############################################################
    numWords := numWords + cy[numWords];
    a := random(2**_datalength_);
    b := random(2**_datalength_);
    b := bit_or(b, 1);
    c := random(2**_datalength_);
    for j := 0 to w2powX do
        i := bit_and( bit_xor( (bit_xor(j,a) * b), c), w2powX);
        if ( i < numWords ) then
                R.datarray[R.wordsallocated-1-i]   := (GetWord (A,i) +
bit_xor(GetWord(B,i), (2**_datalength_)-1) + cy[i]) mod 2**_datalength_;
        end;
    end;
    return R;
end;
```

According to an alternative embodiment, it is also possible to use a randomized chronological order ("Timing"). This is shown by way of example below on the basis of a "Long Integer Addition_Alternative" function.

```
function LongIntegerAddition_Alternative(A,B : CLONG) : CLONG;
```

```
external
    _datalength_       : integer;
var
    i, j, k, sm        : integer;
    numWords           : integer;
    cy                 : array of integer;
    a, b, c            : integer;
    w2powX             : integer;
    wMask1Bit          : integer;
    R                  : CLONG;
begin
    numWords      := (A.bitlength + (_datalength_ -1)) div _datalength_;
    numWords      := max( numWords, (B.bitlength + (_datalength_ -1)) div
_datalength_ );
    R             := ALLOCCLONG( numWords + 1 );
    R.bitlength   := (numWords+1)*_datalength_;
    cy            := alloc(array, numWords);
    #############################################
    # Randomized addition of operands A and B #
    #############################################
    wMask1Bit   := 0x4000;
    w2powX      := 1;
    while not( wMask1Bit = 0 ) do
        if not(bit_and(wMask1Bit, bit_or(1,(numWords-1)))=0) then
                w2powX       := wMask1Bit * 2;
                wMask1Bit    := 0;
            end;
            wMask1Bit := wMask1Bit div 2;
    end;
    w2powX      := w2powX - 1;
    a           := random(2**_datalength_);
    b           := random(2**_datalength_);
    b           := bit_or(b, 1);
    c           := random(2**_datalength_);
    for i:= 0 to w2powX do
        j := bit_and( bit_xor( (bit_xor(i,a) * b), c), w2powX);
        if ( j <= numWords-1 ) then
                sm     := GetWord(A, j) + GetWord(B,j);
                cy[j]  := sm div (2**_datalength_);
                R.datarray[numWords-j] := sm mod (2**_datalength_);
```

-continued

```
function LongIntegerAddition_Alternative(A,B : CLONG) : CLONG;
            end;
    end;
    ###########################################################
    # Randomized addition of the remaining carry bits #
    ###########################################################
    for k:= 1 to numWords-1 do
            a := random(2**_datalength_);
            b := random(2**_datalength_);
            b := bit_or(b, 1);
            c := random(2**_datalength_);
            for i:= k to w2powX do
                    j := bit_and( bit_xor( (bit_xor(i,a) * b), c), w2powX);
                    if ( j <= numWords-1 ) then
                            sm      := GetWord(R, i) + cy[i-1];
                            cy[i]   := cy[i] + sm div (2**_datalength_);
                            cy[i-1] := 0;
                            R.datarray[numWords-i] := sm mod (2**_datalength_);
                    end;
            end;
    end;
    R.datarray[0]           := cy[numWords-1];
    return R;
end;
```

FIG. 1 shows a schematic diagram to illustrate steps for increasing the security of an operation based on two operands vis-à-vis side channel attacks, for example. An operand A 101 is logically combined with operand B 102 by means of an operation. By way of example, the operation may be addition, subtraction, binary logic combination, a comparison operation or the like. In a block 103, individual steps of the operation are performed in time-randomized fashion. Optionally (cf. block 104), at least portions of the operation can be performed in masked fashion. By way of example, the operands and/or interim results, e.g. individual bits or bit groups, can be masked. In particular, it is advantageous if the masking is ensured up to the end or essentially up to the end of the operation.

The approach explained in the present case is suitable for a large number of applications in which particularly side channel attacks are intended to be made more difficult. By way of example, it is thus effectively possible for the success of current profile analysis and/or any noninvasive observation to be significantly reduced, since it is no longer readily possible to identify externally when what portion of the operation is performed or what portion of the operands with what (interim) results.

By way of example, this solution may be provided on secure platforms or modules, for example in security chips for computers, smart phones, tablets, notebooks, etc., for example. The solution may also be part of a cryptographic application, for example.

By way of example, the disclosure can be used in telecommunication, in the automotive sector, in chip cards, in controllers, in processors, in monitoring units, in counters, in measuring units, etc. In particular, the disclosure can be used in an environment that allows or requires a public key infrastructure.

Although the disclosure has been illustrated in more detail and described by way of at least one exemplary embodiment shown, the disclosure is not restricted thereto and other variations can be derived therefrom by a person skilled in the art without departing from the scope of protection of the disclosure.

The invention claimed is:

1. A method comprising performing, by a processor having a carry look ahead adder, an operation based on at least two operands, wherein the operation is an addition, a subtraction or a comparison, the operation is based on the carry look ahead adder, and steps of the operation are performed in a random or pseudo-random order by virtue of access operations on portions of the operands being performed in random or pseudo-random order.

2. The method as claimed in claim 1, wherein each of the operands is a long integral operand having a bit length of more than 128 bits.

3. The method as claimed in claim 1, wherein generate bits and propagate bits of the carry look ahead adder are determined on the basis of a binary tree structure iteratively in the direction of the root of the binary tree structure, at least to some extent in random or pseudo-random order.

4. The method as claimed in claim 3, wherein carry bits of the carry look ahead adder are determined on the basis of the binary tree structure iteratively in the direction of the root of the binary tree structure, at least to some extent in the random or pseudo-random order.

5. The method as claimed in claim 4, wherein the carry bits and the operands are added in the random or pseudo-random order.

6. The method as claimed in claim 1, wherein the operation is the subtraction.

7. The method as claimed in claim 1, wherein the operation comprises the comparison for the at least two operands or for two memory areas.

8. The method as claimed in claim 1, wherein the steps of the operation are performed at least to some extent with masked data.

9. The method as claimed in claim 8, wherein the masked data comprise at least one processing bit of the operation.

10. The method as claimed in claim 9, wherein the processing bit is selected from the group consisting of a carry bit, a propagate bit, and a generate bit.

11. The method as claimed in claim 8, wherein the operands are masked and the result of the operation is demasked at the end of the operation.

12. The method as claimed in claim 11, wherein the operands are masked with a shared mask or with two different masks.

13. A non-transitory computer-readable medium comprising a computer program product that is loadable directly into a memory of a digital computer, the computer program product comprising program code portions that, when executed cause the digital computer to perform steps of a method as claimed in claim 1.

14. A non-transitory computer-readable storage medium comprising instructions that, when executed cause a computer to perform steps of a method as claimed in claim 1.

15. An apparatus comprising a processor having a carry look ahead adder, wherein the processor is set up to perform an operation based on two operands, wherein the operation is an addition, a subtraction or a comparison, the operation is based on the carry look ahead adder, and steps of the operation are performed in random or pseudo-random order by virtue of access operations on portions of the operands being performed in random or pseudo-random order.

16. A method comprising performing, by a processor having a carry look ahead adder, a subtraction based on at least two operands, wherein the subtraction is based on the carry look ahead adder, and steps of the subtraction are performed in a random or pseudo-random order by virtue of access operations on portions of the operands being performed in random or pseudo-random order.

17. An apparatus comprising a processor having a carry look ahead adder, wherein the processor is set up to perform a subtraction based on two operands, wherein the subtraction is based on the carry look ahead adder, and steps of the subtraction are performed in random or pseudo-random order by virtue of access operations on portions of the operands being performed in random or pseudo-random order.

\* \* \* \* \*